United States Patent [19]

Shigemoto et al.

[11] Patent Number: 4,693,677
[45] Date of Patent: Sep. 15, 1987

[54] FLAT DIE NECK-IN CONTROL DEVICE

[75] Inventors: Hiromi Shigemoto; Akio Yamamoto, both of Iwakuni; Iwatoshi Suzuki, Yamaguchi, all of Japan

[73] Assignee: Mitsui Petrochemical Industries, Ltd., Tokyo, Japan

[21] Appl. No.: 854,897

[22] Filed: Apr. 23, 1986

[30] Foreign Application Priority Data

Apr. 24, 1985 [JP] Japan .................. 60-88093

[51] Int. Cl.4 ...................... B29C 47/14; B29C 47/32
[52] U.S. Cl. .......................... 425/376 R; 425/376 B; 425/394; 425/461
[58] Field of Search ............. 425/461, 376 R, 376 B, 425/207, 394

[56] References Cited

U.S. PATENT DOCUMENTS

| | | | |
|---|---|---|---|
| 3,947,201 | 3/1976 | Ellwood | 425/376 R |
| 4,411,614 | 10/1983 | Feathers | 425/461 |
| 4,536,357 | 8/1985 | Hayashi et al. | 425/461 |
| 4,536,362 | 8/1985 | Donaldson | 425/461 |

FOREIGN PATENT DOCUMENTS 55-113215  8/1980  Japan.

Primary Examiner—Willard E. Hoag
Attorney, Agent, or Firm—Cushman, Darby & Cushman

[57] ABSTRACT

A neck-in control device of a flat die comprising a pair of inducing guides, provided at both ends of a resin extruding outlet of the flat die, for inducing a molten resin extruded from the resin extruding outlet to move outward, whereby an inward neck-in of the molten resin is suppressed.

5 Claims, 7 Drawing Figures ces in the art.

FLAT DIE NECK-IN CONTROL DEVICE

BACKGROUND OF THE INVENTION

1. Field of the Invention

The present invention relates to a neck-in control device of a flat die. More specifically, it relates to a neck-in control device of a flat die capable of minimizing neck-in generated in a molten resin extruded from a flat die (or T-die) during film extrusion molding in, for example, extrusion laminate molding.

2. Description of the Related Art

Film extrusion molding methods in which molten resins are extruded in the form of a film from flat dies, such as so-called straight type and coat hanger type dies, are widely known in the art and are utilized for the production of films per se and for the extrusion lamination molding used to laminate base materials with the extruded films.

However, when molten resins flow from dies, the so-called "neck-in" phenomenon occurs. Neck-in is a phenomenon in which the width of molten resin films extruded from the dies becomes narrow and the edge portions of the films become thick, as shown in FIG. 2.

The neck-in phenomenon is caused by the combined force of a surface tension of the molten resin around the die portion, the melt elastic effect, and the tensile stress of the molten resin towards the take-off direction. This phenomenon is always generated, although the extent thereof depends upon, for example, the type and molecular weight of the thermoplastic resins utilized. Furthermore, in addition to the neck-in phenomenon, so-called wavy edges (i.e., waving or undulation occurs in both edge portions of the extruded film) are generated as the molten resin film is extruded.

Especially, thermoplastic resins having a low melt tension such as polyethylene terephthalate, polypropylene, poly 4-methyl-1-pentene, and polyamide exhibit a large neck-in phenomenon and easily tend to easily incur wavy edges. When the wavy edge phenomenon occurs, both edges of the film are formed with undulations and, therefore, coating the film on a base material or substrate becomes impossible. Thus, the edge heads generated by the neck-in phenomenon during the molding must be trimmed by a cutter at a subsequent fabrication step.

Accordingly, when the neck-in is large, the width of the resultant film becomes narrow and the thickness of the both edges becomes thick. As a result, the trimming width becomes large and, therefore, the available film width is remarkably smaller than the width of the die and much of the extruded film is wasted. Furthermore, a remarkably large sized die must be used to obtain a film having a required width. Consequently, there is a strong need or desire in the art that neck-in should be minimized. Especially, in extruding lamination molding, since the extruded film is successively coated onto a base material such as paper, the extrusion of a film having a width identical to that of the base material, without trimming, is greatly desired.

Furthermore, the so-called draw-down properties (i.e., high speed processability) are generally required in the extruding lamination molding. However, the physical properties of resins (e.g., the above-mentioned thermoplastic resins having a low melt tension) and the processing conditions suitable for improving the draw-down properties increase the occurrence of the neck-in phenomenon.

Accordingly, it is strongly desired in the art to reduce neck-in, while improving the draw-down properties.

Various attempts have been made to reduce neck-in. For example, a method in which the distance between the resin extruding outlet of a die and a chill roll (i.e., a so-called "air gap") is made short, is often used, as it is the most simple method. However, since in the extruding lamination molding it is necessary to extrude a molten resin to or around the contact line of a chill roll and a nip roll, there is necessarily a limit to the shortening of the air gap distance, in view of the size of the die head, and therefore, neck-in cannot be fully eliminated by this method.

Accordingly, the extent of the neck-in is generally adjusted (but not prevented), at present, by moving the deckel plate and adjustment rod backward and forward.

SUMMARY OF THE INVENTION

Accordingly, the objects of the present invention are to eliminate the above-mentioned problems in the prior art and to provide a neck-in control device capable of minimizing the undesirable neck-in phenomenon and ensuring that both edge portions of a film are stable.

Another object of the present invention is to eliminate the generation of the above-mentioned wavy edges in a film.

Other objects and advantages of the present invention will be apparent from the following description.

In accordance with the present invention, there is provided a neck-in control device of a flat die comprising a pair of inducing guides provided at both ends of a resin extruding outlet of the flat die, for inducing an outward flow of a molten resin extruded from the resin extruding outlet, whereby neck-in of the molten resin is suppressed.

BRIEF DESCRIPTION OF THE DRAWING

The present invention will be better understood from the description set forth below with reference to the accompanying drawings illustrating, but is not intended to be limited to, the preferred embodiments of the present invention, in which.

DESCRIPTION OF THE PREFERRED EMBODIMENT

Figure 1:
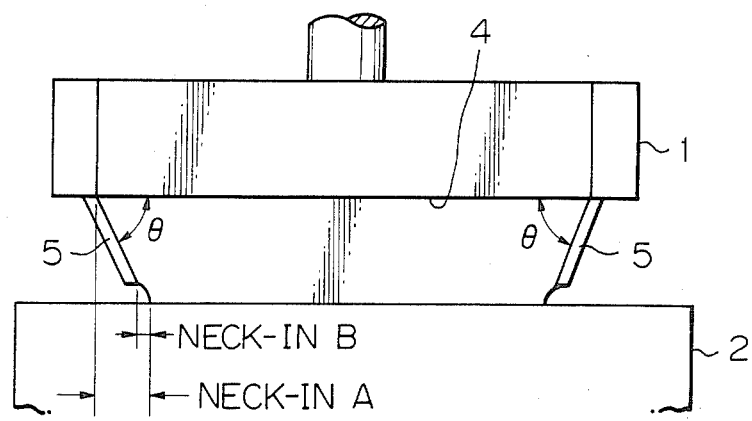
FIG. 1 is a front view of one embodiment of the T-die according to the present invention.
Figure 3:
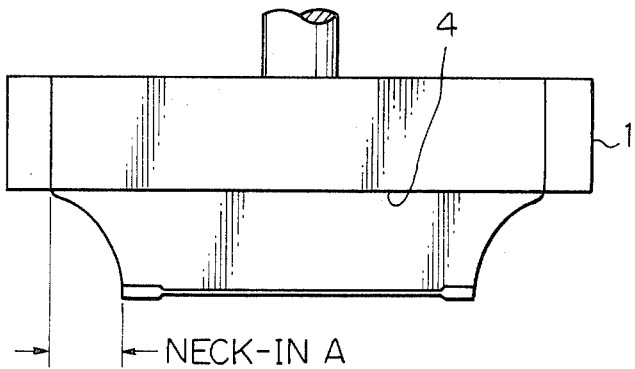
FIG. 3 is a front view of a conventional T-die portion.
Figure 2:
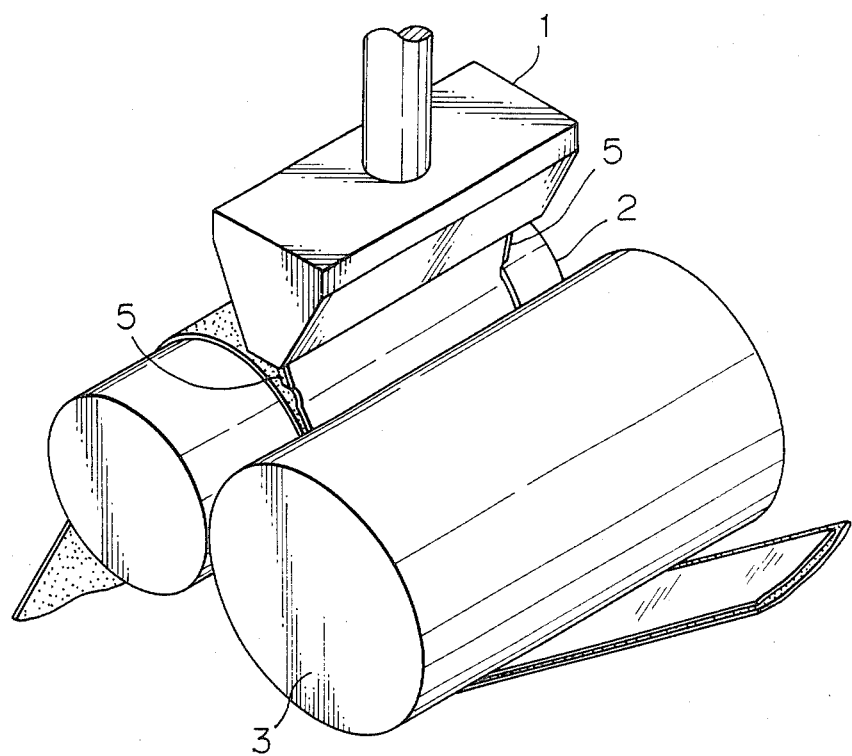
FIG. 2 is a perspective view of the T-die portion, according to the present invention, of a lamination molding machine.
Figure 4:
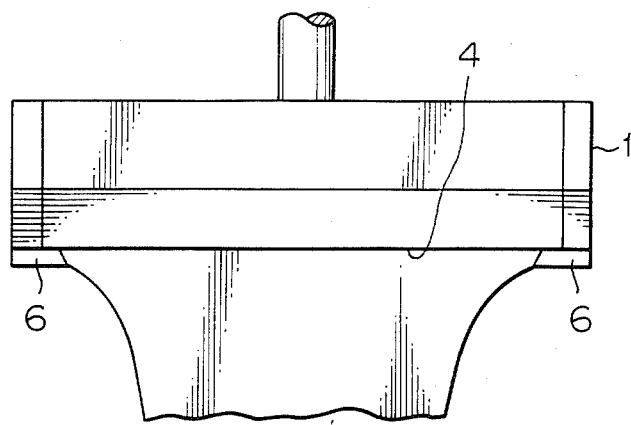
FIG. 4 is a front view of another conventional T-die portion.
Figure 5:
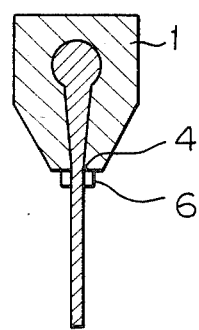
FIG. 5 is a longitudinal side cross sectional view thereof.
Figure 6:
FIGS. 6 and 7 are perspective views illustrating the parts used in the conventional T-die portion.
Figure 7:

Referring to FIGS. 1 and 2, the width of a molten resin film extruded from the resin extruding outlet 4 ends to become narrow due to the neck-in phenomenon. However, since, according to the present invention, both edge portions of the extruded film are extruded along with the lines formed by the inducing guides 5, 5 due to an adsorption or wetting phenomenon, the neck-in phenomenon can be minimized or prevented and the molten resin in both edge portions is smoothly extruded and flowed down, guided by the inducing guides 5, 5, without being retained around the resin extruding outlet 4. Furthermore, the generation of wavy edges can be effectively suppressed because both edges of the film are supported by the inducing guides 5, 5.

When the length of the inducing guides 5, 5 is such that the guides 5, 5 extend from the resin extruding outlet 4 to the position where the tips (or front edges) of the guides 5, 5 are in contact with a chill roll 2 or a contact line of the chill roll 2 and a nip roll 3, neck-in can be substantially prevented. However, if the tips of the guides 5, 5 are allowed to come in actual contact with the chill roll 2, this may cause damage to the laminate base material (or substrate), the chill roll 2, and the like, or a problem may arise in that the guides 5, 5 become caught between the chill roll 2 and the nip roll 3. Therefore, it is generally preferable that a clearance or gap of at least 1 mm, more preferably 3 to 10 mm, is provided between the tips of the inducing guides 5, 5 and the chill roll 2. The inducing guides 5, 5 may be heated in any conventional manner, so long as the extruded molten resin in contact with the guides 5, 5 does not become cool.

The angle $\theta$ formed between the guides 5, 5 and the resin extruding outlet 4 is preferably 90° or less. When the angle $\theta$ is more than 90°, it is probable that both edge portions of the molten resin film will not be adsorbed by the guides 5, 5. Thus, the upper limit of the angle $\theta$ is generally 90° or less, preferably a sharper angle of less than 90°, more preferably 88° or less. On the other hand, although there are no specific limitations to the lower limit of the angle $\theta$, the lower limit is generally 45° or more, preferably 60° or more. This is because, when the angle $\theta$ is too small, the width of the molten resin becomes narrow due to the presence of the guides 5, 5 and, therefore, the neck-in phenomenon occurs in the resultant film, although neck-in is not actually generated.

In the preferred embodiment of the present invention, the inducing guides 5, 5 may be assembled in such a way that the guides 5, 5 are freely rotatably supported at the base portion thereof (as shown in phantom lines in FIG. 1), whereby the angle $\theta$ formed between the resin extruding outlet 4 and the guides 5, 5 is variable and controllable.

As a result, the width of the extruded film can be readily adjusted, so that various laminate films including single layer and multi-layer films can be stably extrusion molded.

The shapes of the inducing guides 5, 5 are not specifically limited as long as the surface of the inducing guides 5, 5, with which the molten resin is in contact, does not inhibit the flow of the molten resin. For example, the inducing guides 5, 5 can be formed in the shape of plates, yaru, strips, arches, rods, and wires.

The inducing guides 5, 5 can be formed from any material as long as the material has a heat resistance such that the shape of the guides 5, 5 is not changed by the heat from the molten resin. Examples of such materials are heat resistant thermoplastic resins (e.g., polyetheretherketon (PEEK), polyphenylenesulfide (PPS), aromatic polyamide, polyterafluoroethylene), heat resistant thermosetting resins (e.g., phenol resin, unsaturated polyester, epoxy resin diallyl phthalate resin), metals (e.g., copper, iron, silver, tin), carbon fiber, and heat resistant glass.

The inducing guides 5, 5 according to the present invention can be provided at any molten resin vertical extrude type flat die, including a single layer die, a two or multi layer die, an outer deckel die, and an inner deckel die.

Note, a certain technical means, which is erroneously understood to be similar to the device according to the present invention, is taught in Japanese Unexamined Utility Model Publication (Kokai) No. 55-113215. This publication is intended to solve the problems caused in the case where the molten resin film formed by the so-called T-die method is stretched by a tenter method. That is, when the edge portions of the film are largely fluctuated due to the neck-in phenomenon (Note: this fluctuation of the edge portions is caused not by neck-in but by other factors—especially when the draft ratio is large, the fluctuation becomes large), both edge portions of the film are not stably held by the clips of the tenter and a stretching breakage often occurs. Thus, the workability and the yield are unpreferably decreased.

The above-mentioned publication proposes, as a means for solving the above-mentioned problems, that parts (or tools) 6 are provided at both outer ends of a lip forming a resin extruding outlet 4 of a T-die 1 as shown in FIGS. 4 to 7. The parts 6 are mounted in a direction from the edge portion to the center of the T-die 1. The parts 6 are formed in such a way that the tip (or front edge) portions thereof form a sharp angle and that the length of the lower side is larger than that of the upper side. Thus, the edge portion of the molten resin is once retained in the part 6 and then flows down behind the center portion. As a result, the edge portions become thick and fluctuations of the edge portions are prevented.

As mentioned above, the technique taught in Japanese Unexamined Utility Model Publication No. 55-113215 is intended to thicken the edge portions of the extruded film and, therefore, the trimming width is increased and the neck-in phenomenon of the film is not reduced but enhanced. This is completely contrary to the objects of the present invention. Furthermore, the structure of the parts 6 is designed in such a way that the parts can prevent the smooth flow of the extruded molten resin by inwardly projecting the parts 6 from the ends of the die. This is a modification of the so-called outer deckel type die and cannot attain the objects of the present invention, i.e., the reduction of the neck-in phenomenon, the prevention of the deterioration of the edge portions, and the wavy edges.

The flat die provided with the neck-in control device according to the present invention is applicable to any thermoplastic resins, including crystalline and amorphous resins, as long as the resins are capable of extrusion molding. Examples of such resins are polyolefins such as low-density polyethylene, high-density polyethylene, polypropylene, polybutene, poly 4-methyl-1-pentene, and random and block copolymers of $\alpha$-olefins such as ethylene, propylene, 1-butene, and 4-methyl-1-pentene; ethylene-vinyl compound copolymers such as ethylene-acrylic acid copolymers, ethylene-vinyl acetate copolymer, ethylene-vinyl alcohol copolymer, and ethylene-vinyl chloride copolymer; styrene resins such as polystyrene, acrylonitrile-styrene copolymer, ABS resins, methyl methacrylate-styrene copolymer, and $\alpha$-methylstyrene-styrene copolymer; polyvinyl compounds such as polyvinyl chloride, polyvinylidene chloride, vinyl chloride-vinylidene chloride copolymer, polymethyl acrylate, and polymethyl methacrylate;

polyamides such as nylon 6, nylon 6-6, nylon 6-10, nylon 11, and nylon 12; thermoplastic polyesters such as polyethylene terephthalate and polybutyrene terephthalate; polycarbonate; polyphenylene oxide; and any mixture thereof.

Of the above-mentioned thermoplastic resins, the neck-in prevention effects and the wavy edge prevention effects obtained by the present invention can be maximized when thermoplastic resins having a low melt tension such as polypropylene, poly 4-methyl-1-pentene, ethylene-α-olefin copolymers (i.e., L-LDPE), polyamide, polyester, polymethyl methacrylate, polystyrene, polycarbonate, polysulfone, and ethylene-vinyl acetate copolymer are used.

According to the present invention, both edge portions of the molten resin films extrudated from the resin extrusion outlet are adsorbed or attracted to the inducing guides by using a flat die provided with the neck-in control device of the present invention. Thus, the unpreferable neck-in phenomenon can be minimized and the formation of unpreferable wavy edges can be suppressed, even under high speed extrusion molding conditions, because both edges of the film are supported by the inducing guides. Accordingly, the width of the film can be maximized, the trimming loss at both edges can be minimized, and high speed extrusion molding can be stably carried out. Furthermore, since the molten resins extruded from both ends of the die are guided by the inducing guides, the molten resins flow smoothly down without being retained and, therefore, deterioration and gellation of the resins do not occur.

EXAMPLES

The present invention will now be further illustrated by, but is by no means limited to, the following examples.

Example 1

Poly 4-methyl-1-pentene (i.e., "PMP") having a melt flow rate of 70 g/10 min at 260° C. under a load of 5 kg determined according to ASTM D1238 (TPX-DX810 available from Mitsui Petrochemical Industries Ltd.) was melt extruded onto a white paper board having a thickness of 70 $\mu$m, through a 30 mm$\phi$ extrusion laminate molding machine.

The T-die portion 1 of the extrusion laminate machine was as shown in FIGS. 1 and 2 and the molten resin film extruded from the T-die 1 was taken-off by a chill roll 2 and a nip roll 3 as shown in FIGS. 1 and 2. The distance from the resin extrusion outlet 4 of the T-die 1 to the chill roll 2 was set to 30 mm and a pair of inducing guides 5, 5 for guiding the molten resin extruded from the extrusion outlet 4 outward.

The pair of the inducing guides 5, 5 were formed from copper plates into a rectangular shape, when viewed from the side of the T-die 1, and were downwardly extended from the resin extruding outlet 4. The angle $\theta$ formed between the inducing guides 5, 5 and the resin extruding outlet 4 was a sharp angle of 85°, when viewed from the take-off side, so that the guides 5, 5 were inclined inwardly from the T-die 1. The length of the inducing guides 5, 5 was about 25 mm and the interval between the tip of the guides 5, 5 and the roll contact line was set to 5 mm.

During the molding, both ends of the molten resin film extruded from the T-die 1 were absorbed by the inducing guides 5, 5 and the film flowed down between the chill roll 2 and the nip roll 3 along with the inducing guides 5, 5. A small neck-in B of 2 mm was generated between the tips of the inducing guides 5, 5 and the chill roll 2. The take-off speed was 30 m/min. The overall neck-in A was 10 mm when viewed from the base portion of the inducing guides 5, 5.

Furthermore, both ends of the molten resin film were in a condition such that they were supported by the inducing guides 5, 5', since the both ends of the molten resin film passed along the inducing guides 5, 5'. Accordingly, the so-called phenomenon of wavy edge generation was suppressed. Also, since both end portions of the molten resin were guided by the inducing guides 5, 5, the molten resin was smoothly extruded, without being retained around these areas. The results are shown in Table 1.

Example 2

Example 1 was repeated, except that the film coating thickness was changed to 15 $\mu$m and that the take-off speed was changed to 90 mm/min. The results are shown in Table 1.

Example 3

Example 1 was repeated, except that the length of the inducing guides 5, 5 was changed to about 26 mm and that the angle $\theta$ formed between the inducing guides 5, 5 and the T-die 1 was changed to 75°. The results are shown in Table 1.

Comparative Example 1

Example 1 was repeated, except that the inducing guides 5, 5 were not used. The results are shown in Table 1.

Comparative Example 2

Example 2 was repeated, except that the inducing guides 5, 5 were not used. The results are shown in Table 1.

As is clear from the results shown in Table 1, according to the present invention the neck-in can be remarkably reduced and, furthermore, the generation of a wavy edge of the extruded films can be effectively prevented even under a high extrusion speed. Thus, the extrusion condition is good.

TABLE 1

| No. | Neck-in A (mm) | Extrusion condition | Neck-in B (mm) |
|---|---|---|---|
| Example 1 | 10 | No trouble | 2 |
| Example 2 | 12 | No trouble | 3 |
| Example 3 | 15 | No trouble | 3 |
| Comparative Example 1 | 50 | Although both ends of extruded film were stable, neck-in was large and edge portions were thick. | — |
| Comparative Example 2 | 60–100 | Wavy edges were generated in extruded film, and neck-in was large and was extremely varied. The edge portions were thick. | — |

We claim:

1. In an extrusion and roll forming apparatus including resin extruder with a flat sheet-forming die and first and second rollers, said die being disposed for delivering extruded resin to said rollers, the improvement comprising:

a control device including a pair of inducing guide members, one of said guide members being mounted to a first longitudinal end of said flat die and the other of said guide members being mounted to a second longitudinal end of said flat die, an inner surface of each of said guide members being disposed so as to provide a smooth extension of the adjacent inner surface of said flat die of said resin extruder, said guide members extending at least from said flat die to a point adjacent to at least one of said first and second rollers, whereby, neck-in of the extruded resin is minimized.

2. Apparatus as in claim 1, wherein said guide members extend to a point spaced about 1.0 to about 10.0 mm from said at least one of said first and second rollers.

3. Apparatus as in claim 1, wherein each of said guide members extends from said outlet at an angle of between about 0° and about 90°.

4. Apparatus as in claim 3, wherein said angle is between about 45° and about 90°.

5. Apparatus as in claim 3, wherein each said guide member is rotatably mounted to said outlet ends, respectively, so that said angle formed between said outlet and said guide members can be adjusted.

* * * * *